United States Patent [19]

Villaveces et al.

[11] Patent Number: 4,576,389
[45] Date of Patent: Mar. 18, 1986

[54] CART FOR TRANSPORTING SHOCK SENSITIVE LOADS, OR UNSTABLE LOADS

[76] Inventors: James Villaveces, 3300 San Luis St., Ventura, Calif. 93003; Steven T. Golden, 822 Teaque Dr., Santa Paula, Calif. 93060

[21] Appl. No.: 695,253

[22] Filed: Jan. 25, 1985

[51] Int. Cl.$^4$ .............................................. B62B 1/04
[52] U.S. Cl. ................................. 280/43.16; 267/41; 280/655; 280/47.24
[58] Field of Search ................... 180/906; 280/638, 42, 280/43.16, 47.21, 47.22, 47.27, DIG. 6, 655, 47.24; 267/158, 160, 41, 47; 403/300, 309, 313

[56] References Cited

U.S. PATENT DOCUMENTS

| | | | |
|---|---|---|---|
| 2,513,020 | 6/1950 | Haney | 280/DIG. 6 |
| 2,556,814 | 6/1951 | Love | 280/DIG. 6 |
| 3,039,800 | 6/1962 | Morse | 403/341 X |
| 3,093,387 | 6/1963 | O'Neill | 280/47.12 |
| 3,334,910 | 8/1967 | Wilson et al. | 280/DIG. 6 |
| 3,998,476 | 12/1976 | Kazmark, Sr. | 280/655 |
| 4,062,564 | 12/1977 | Schimmeyer | 280/DIG. 6 X |
| 4,062,565 | 12/1977 | Holtz | 280/655 |
| 4,248,453 | 2/1981 | Stark | 280/655 |
| 4,284,287 | 8/1981 | Esposito | 280/47.37 R |
| 4,286,796 | 9/1981 | Esposito | 280/47.27 |
| 4,315,635 | 2/1982 | Esposito | 280/655 |
| 4,412,689 | 11/1983 | Lee | 280/47.37 R |

Primary Examiner—Joseph F. Peters, Jr.
Assistant Examiner—Michael Mar
Attorney, Agent, or Firm—Milton S. Gerstein

[57] ABSTRACT

A cart with extensible axles for transporting shock sensitive loads, computers, luggage and the like, which cart is provided with a wheel base that is adjustable to fit the various sizes and weights of the loads supported on the cart. In a first embodiment, the wheel base is adjustable via a hollow tube having a pair of oppositely-disposed slots formed at the ends of the tube. Each axle of the cart has a J-shaped hook at its end remote from the wheel it carries, which hook rides in the slot disposed on the opposite end of the tube. The diameter of the tube is such that the two axles can pass only by the application of force to overcome the friction caused by the oppositely-moving snug-fitting axles. The slots are arranged on the bottom circumferential portion of the tube and are parallel to the longitudinal axis of the tube, but are spaced angularly with respect to each other about the outer circumference of the tube to aid in the frictional holding of the axles upon extension and retraction. The axles are made of spring material, to provide shock-absorbing qualities, and to prevent damage to the equipment being transported. In another embodiment, the axles are held in their chosen extensions by spring detent means cooperating with the hollow interior of the tube.

8 Claims, 11 Drawing Figures

CART FOR TRANSPORTING SHOCK SENSITIVE LOADS, OR UNSTABLE LOADS

BACKGROUND OF THE INVENTION

The present invention is directed to axles on carts used for transporting items, such as luggage, and the like, and which can be used to transport computer components that are very sensitive to shock and jolts delivered while being transported.

Carts for transporting luggage, and the like are well-known and examples of such can be found in the following:

U.S. Pat. No. 3,998,476—Kazmark;
U.S. Pat. No. 4,062,565—Holtz;
U.S. Pat. No. 4,248,453—Stark.

However, none of the prior axles on these carts offer safe transport for sensitive equipment, such as computer components, or an adjustable axle width for added stability on narrow width carts such as luggage carts.

SUMMARY OF THE INVENTION

It is, therefore, the primary object of the present invention to provide a cart axle for transporting elements which cart axle absorbs shocks and jolts, so as to cushion the ride for the sensitive equipment being transported by the cart.

It is object of the present invention to allow for such safe ride in a manner than can allow for adapting the cart axle to the size and weight of the item being carried so that the amount of shock-absorbing and jolt-absorbing qualities extant in the cart can be varied to suit the load.

It is still another object of the present invention to allow, at the same time of adjusting the force-absorbing capabilities of the cart, for the expansion and retraction of the wheel base of the cart to suit the particular load being transported.

It is yet another object of the present invention to allow for an infinite amount of positions of the wheels of the cart by the adjustment of the axles.

Toward these above-ends, the present invention, in its preferred embodiment, consists of a tube of circular cross-section in which are slidable the pair of axles which support at their remote ends the wheels for rollingly supporting the cart for travel. The axles fit snugly within the tube such that they require force to overcome the friction therebetween and between the inner wall of the tube, so that any setting of the wheel base will remain fixed until the proper force is applied to overcome the friction preventing relative movement between the axles. The tube is provided with a pair of non-aligned slots, with each slot having an open end at an end of the tube. The slots receive hooked-shaped ends of the axles, such that the end of each axle has its hook riding in a slot at the opposite end of the tube from which it protrudes. The hooks catch the inner ends of the slots upon full extension of the axles, to thus limit the maximum extension possible, thereby imposing the maximum wheel base length. The slots are offset relative to each about the circumference of the tube, such that each slot extends parallel to the longitudinal axis of the tube but along a portion of the tube angularly offset from the other slot.

In another embodiment of the invention, the wheel base adjustability is achieved via a square tube in which slides a force-fit element attached to the end of each axle. The limit of extension of each axle is achieved by an abutment at the extremity of the tube.

In yet another embodiment, the adjustability is achieved by a sliding axle in a tube, which tube is provided with a pair of detent springs urged against the portions of the axles riding in the tube. The springs hold the axles in their relative positions until force is applied by the user of the cart to overcome the biassing force of the springs.

BRIEF DESCRIPTION OF THE DRAWING

The invention will be more readily understood with reference to the accompanying drawing, wherein.

DETAILED DESCRIPTION OF THE INVENTION

Figure 1:
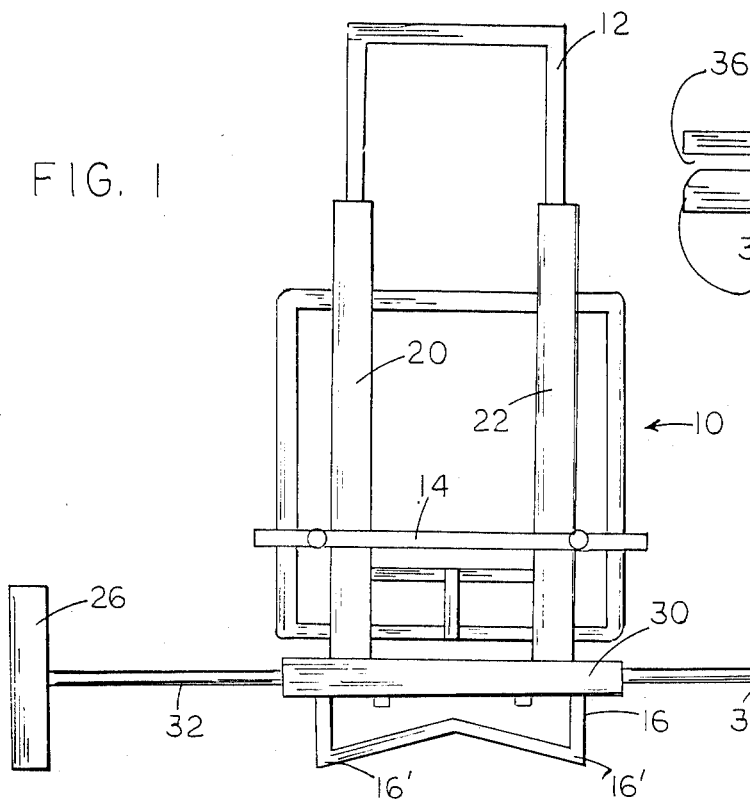
FIG. 1 is a rear view showing a cart having the wheel-base adjusting structure of the present invention thereon.

Referring now to the drawing in greater detail, the axle of the present invention is depicted in FIG. 1. The cart 10 with the axle of the present invention includes the standard and well-known features, such as the handle portion 12, load-supporting rack 14 upon which is supported the item or load to be transported by the cart, front brace 16 having a lower end portion 16' supported by the ground for supporting the forward end of the load-supporting rack 14, which front brace 16 is connected to the forward portion of the load-supporting rack 14 by any conventional means, upright support posts 20 and 22, and frame 24.

Figure 2:
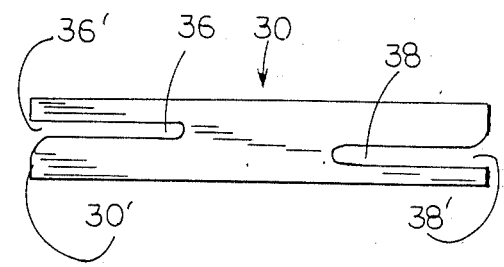
FIG. 2 is a plan view showing the axle tube for allowing adjustability of the wheel base by permitting sliding movement of the axles of the cart therein.

The cart utilizing the present invention is provided with a wheel-base adjusting mechanism such that the span of the supporting wheels 26 and 28 may be set at various lengths to accomodate various load-sizes and weights. In the preferred embodiment, this mechanism is realized by a circular tube 30 shown singly in FIG. 2. This tube 30 is mounted to the lower ends of the support posts 20 and 22, as shown in FIG. 1, in a fixed, non-removable manner, as by welding. Tube 30 telescopingly receives in its hollow interior the axles 32 and 34 which mount, respectively, the wheels 26 and 28, at the ends remote from the tube 30. The axles 32 and 34 are reciprocable in the interior of the tube 30, the diameter of the tube being approximately slightly larger than the combined diameters of the two circular cross-sectional axles 32 and 34. Further, each axle 32 and 34 is made of spring steel, in the preferred form to thus provide a cushioned ride to the components, such as computer components, that are supported on the load-bearing surface 14. This cushioning arises from the inherent spinginess of the steel rods themselves. Thus, the load supported on the rack 14 will be cushioned by the absorption of shocks and forces directed at the wheels by the natural absorption of the spring steel rods.

The tube 30 is provided with a pair of open-ended slots 36 and 38. The slot 36 has a first open end 36' leading into the first open end 30' of the tube 30, while the slot 38 has its first open end 38' leading into the second open end of the tube 30, as clearly shown in FIG. 2. The slots 36 and 38 are formed in the bottom circumferential surface of the tube 30, in the preferred embodiment, which bottom surface is that surface facing downwardly when the cart is in its upright position, shown in FIG. 1. The slots 36 and 38 are also preferably offset from one another, so that the slot 36 is angularly offset from the slot 38 about the circumference. Although the slots 36 and 38 are shown parallel to each other and parallel to the longitudinal axis of the tube 30 in FIG. 2, it is within the realm and scope of the present invention to allow for non-parallelism thereof. In that instance, the slot 36 will slope upwardly as viewing FIG. 2 while the slot 38 will slope downwardly as viewing FIG. 2. The upward slope of the slot 36 is such that the open end 36' is at a lower elevation than the remote end of the slot, and the downwardly sloping slot 38 is such that its open end 38' is at a higher elevation than its remote end.

Figure 3:
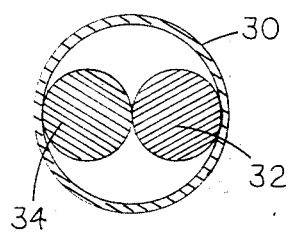
FIG. 3 is a cross-sectional view of the axle tube of FIG. 2 with the pair of axles positioned therein in a snug, friction-tight arrangement.
Figure 5:
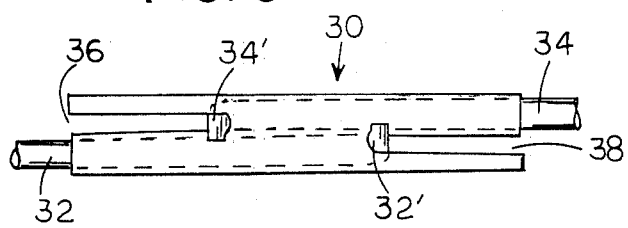
FIG. 5 is a view similar to FIG. 2 but with the axles shown in their extended positions with the J-hooks thereof approaching the slot-ends.

As shown in FIG. 5, each axle 32 and 34 is provided with a hook end 32', 34' with a J-shaped hook formed thereon. The hook rides in one of the slots. The hook of the axle 34 rides in the slot 36, which slot 36 is at the end of the tube 30 opposite to the end from which the axle 34 extends. This is shown in FIG. 5, wherein the hook 32' of the axle 32 rides in the opposite slot 38, while the hook 34' of the hook 34 rides in the opposite slot 36. The extreme, greatest extension of the axles 32 and 34 are defined by abutment of the hook 34' against the remote end of the slot 36, and the abutment of the hook 32' against the remote end of the slot 38. Intermediate positions thereof as well as the maximum extension of the axles are held in place by the frictional contact between the axle shafts themselves, and between the axle shafts and the inner surface of the tube, in a manner depicted in FIG. 3. To move the axles to a new setting to obtain a new wheelbase expanse, the axles must be pulled at their wheel ends, or pushed in at their wheel ends to overcome the friction holding the two axle shafts together. The frictional holding force is further augmented by the fact that the slots 36 and 38 are angularly offset from each other, which provides a twisting action to cause the axle shafts to twist about each other as they are moved.

Figure 6:
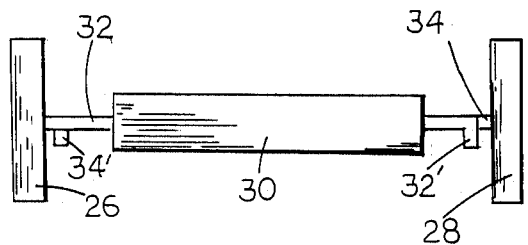
FIG. 6 is a rear view of the axle tube of the present invention with the wheel base at its minimum, inwardly-retracted position.

In FIG. 6, it is shown how the axle shafts are retracted such that the wheel-base is at a minimum.

Figure 7:
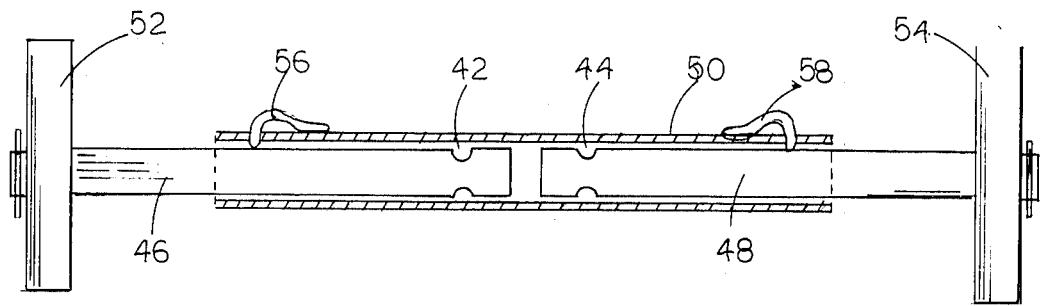
FIG. 7 is a cross-sectional view showing another embodiment of the invention in which the axle extension is achieved via spring detent elements at each end of a tube slidingly mounting the axles at each end of the tube.

In FIG. 7, there is shown a modification of the axle-extension mounting structure. In this embodiment, the J-hook type axle ends have been replaced by beaded portions 42 and 44 adjacent the ends of the axles 46 and 48, respectively. The axles reciprocate in circular tube 50, of sufficient length to ensure all desired positions of the wheels 52 and 54, to define the adjustable wheel base of the cart of the present invention. The tube 50 is provided with a pair of oppositely disposed circumferential openings at the ends thereof, through which openings spring detent elements 56 and 58 protrude. The spring detent elements 56 and 58 are mounted at one end thereof to the outer circumference of the tube 50, adjacent respective ends of the tube, while the free end of each detent element is allowed to project into the interior of the tube, to bear against the outer surface of the axle riding within the tube. Thus, the detents hold the axles in any position to which they have been placed. The spring detents provide a biassing force sufficient to hold in place the axles for all normally occurring forces thereon, but allow for the overcoming thereof by the application of sufficient axial forces on the axles by the user of the cart, so as to reposition and set the wheel base of the car.

The beaded portions 42 and 44 lock the spring detent elements 56 and 58 at the outward-most extension of the wheels 52 and 54 so that the axles 46 and 48, respectively, do not come out of the tube upon maximum extension. Since the beaded portions provide a stop to the extension of the axles, a greater force is needed to shrink the wheel base after the maximum wheel base extension has been set than the simple movement of the axle to any of the lesser extensions of the wheel base from a starting point other than the maximum extension.

Figure 8:
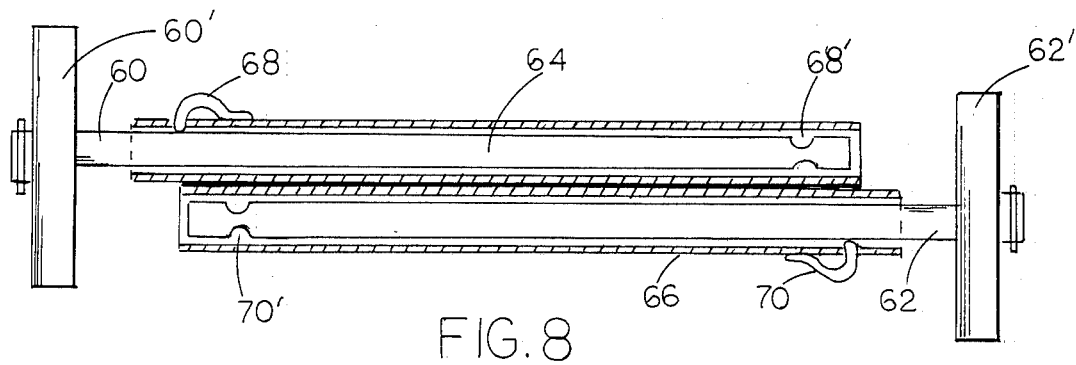
FIG. 8 is a cross-sectional view of still another embodiment of the invention in which the axle extension is achieved via spring detent elements similar to that of FIG. 7 but which is provided with two separate and joined tubes, for mounting the axles separately.

FIG. 8 shows another modification of the axle extension structure. In this embodiment, the axles 60 and 62 are mounted for reciprocation in separate circular tubes 64 and 66, respectively. The tubes 64 and 66 are parallel to each other and are joined along the lengths thereof by a weld, or other suitable fastening means. The view of FIG. 8 is a top view, showing the axles are not coplanar. Thus, the wheel 60' is placed somewhat more forward than the rear wheel 62'. Spring detents 68 and 70 are also provided and operate and function in the same manner as that described above with reference to the embodiment of FIG. 7. The beaded portions 68' and 70' perform the same function as the beaded portions 42 and 44, to provide a stop for maximum wheel base extension.

In still another modification, a square cross-sectional tube 72 is provided in which is mounted the circulr cross-sectional axles 74 for reciprocating movement therein. Each axle 74 has a stop element 76 also of square cross-section for sliding movement within the tube, at each's respective half of the tube. The stop element 76 is suitably affixed to the end of the axle by a weld, or other suitable and conventional fastening means. The stop element 76 is a slip fit for tight and frictional movement in the tube. The ends of the tube 72 are provided with tubular inserts that close off the hollow ends of the tube 72, except for a circular opening of approximately the same diametric extension as the axles themselves, to allow movement of the axles in the tube only with applied force thereto. These tubular inserts 78 are also of square cross-section, and are provided with resilient inner rubber-like circular gasket members that hold the axles in each position they are set. The maximum wheel base extension is defined by the abutment of the stop elements 76 against the tubular inserts 78. In this embodiment also the axles 74 are made of spring steel, and are preferably inclined. Further, the inclined portion of each axle can also be terminated by a straight non-inclining portion, which non-inclining portion rides in the interior of the tube itself, while the inclined portion of the axle stays outside of the interior of the tube 72.

Figure 4:
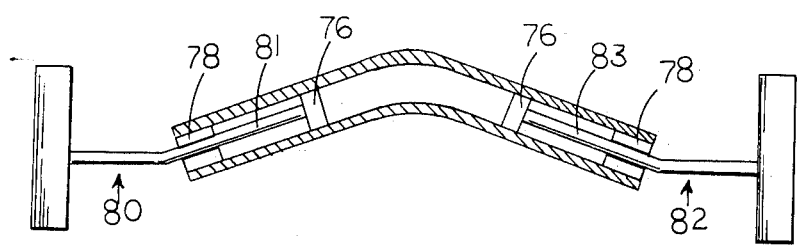
FIG. 4 is a side elevational view showing another modification of the invention in which the tube slidingly mounting the axles is bent.
Figure 9:
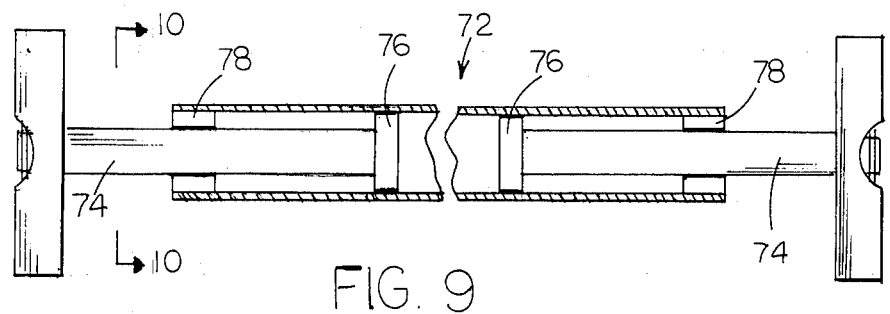
FIG. 9 is a cross-sectional view of still another embodiment showing a tube mounting the axles for extension and retraction, but with the positions of the axles being held by a slip fit at each end of the tube.
Figure 10:
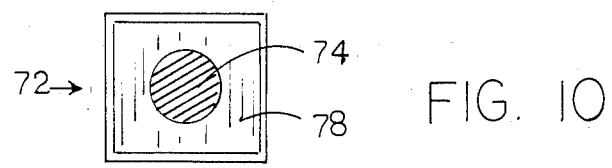
FIG. 10 is a cross-sectional view taken along 10—10 of FIG. 9.
Figure 11:
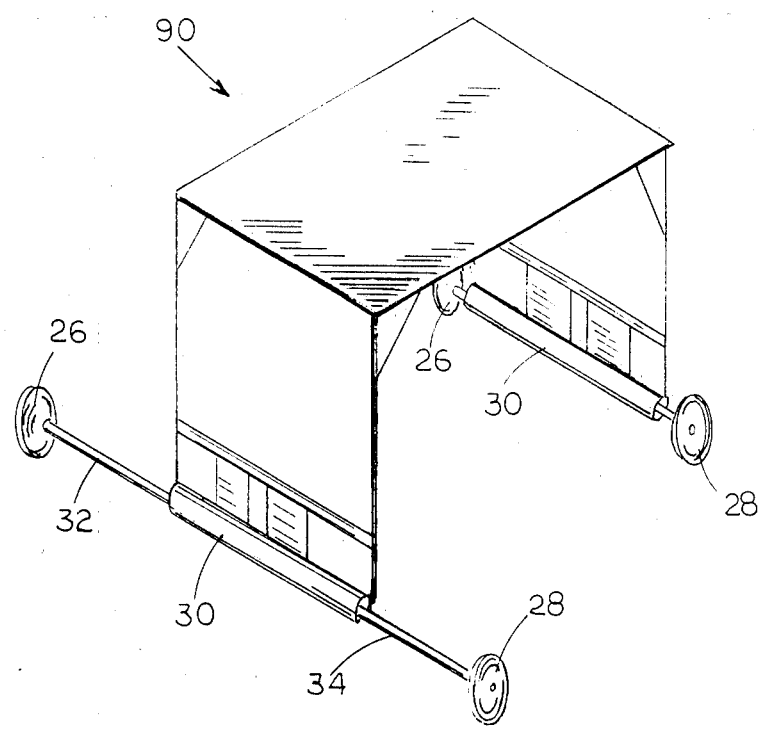
FIG. 11 is a perspective view showing the use of the axles of the invention with a load-sensitive instrument table.

FIG. 4 shows an axle which is angularly bent so as to receive the inclined portions 81 and 83 of the axles 80 and 82, respectively. The axles 80 and 82 are held in their chosen positions in the same manner as that shown in FIG. 9. The elevation of the wheel-ends of the axle may, thus, be adjustable. FIG. 11 shows a sensitive instrument table 90 utilizing the axle of the present invention at both its forward and rear portions.

What is claimed is:

1. A cart axle for transporting shock-sensitive computer equipment, components, and the like, comprising:
   a main carrying base upon which is supported items to be transported, said main carrying base having a first axle with a wheel attached thereon, and a second axle with another wheel attached thereon, said wheels rollingly supporting said main carrying base for movement;
   said main carrying base further comprising means for mounting each of said first and second axles for selective and independent extension and retraction of said axles with respect to said main carrying base so as to accommodate various sizes and various weights of loads carried by said main carrying base;
   said means for mounting comprising tube means for mounting said axles in overlapping relationship therein, said tube means having a first open end and a second open end spaced from said first open end, and a first slot adjacent said first open end and a second slot adjacent said second open end, each said slot being formed along a portion of the circumference of said tube means and extending from adjacent a respective said open end toward the center of said tube means, said tube means causing said axles to be held at a selected extension by friction between the inner surface of said tube means and the outer surfaces of said axles;
   each of said first and second axles comprising a hook means at the end thereof remote from the end to which said wheel is attached, said hook means riding in a respective one of said slots disposed opposite thereto at one of said open ends opposite to the open end adjacent said attached wheel of said axle, whereby upon extension of said axle, said hook means abuts against the closed end of the respective slot to stop movement thereof, said axles overlapping in said tube means for at least some of the extensions thereof.

2. The cart axle according to claim 1, wherein said slots each comprises a first open mouth end connected to a respective one of said first and second open ends, so that upon retraction of said axle, said hook means exits from said slot and out of said tube via said open end.

3. The cart axle according to claim 2, wherein said first slot and said second slot are positioned at different angular locations on the circumference of said tube means; each of said slots extending parallel to the longitudinal axis of said tube means, whereby said axles are held together for all selected positions thereof.

4. The cart axle according to claim 3, wherein said tube means has an inner diameter only slightly larger than the sum of the two diameters of said first and second axles; said first and second slots being formed in said circumference of said tube means in the portions thereof generally facing downwardly when said cart is in its upright position.

5. The cart axle according to claim 4, wherein said tube means is of circular cross-sectional area, and each of said axles is also of circular cross-sectional area.

6. The cart axle according to claim 1, wherein said tube means is of circular cross-sectional shape, and each of said axles is also of circular cross-sectional shape; said tube means having an inner diameter only slightly larger than the sum of the two diameters of said first and second axles; said first and second slots being formed in said circumference of said tube means allowing said extension.

7. The cart axle according to claim 4, wherein said slots each comprises a first open mouth end connected to a respective one of said first and second open ends, so that upon retraction of said axles, said hook means exits from said slot and out of said tube means via said open end.

8. The cart axle according to claim 7, wherein said hook means of each of said axles comprises a J-shaped hook element extending substantially in the same plane as the axle to which it is associated and connected.

* * * * *